July 4, 1944.  L. T. JONES  2,352,716
WELDING
Filed April 24, 1940
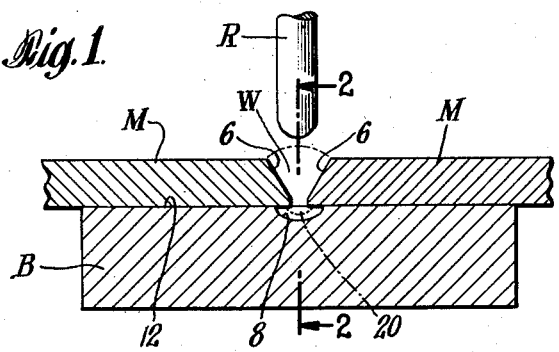
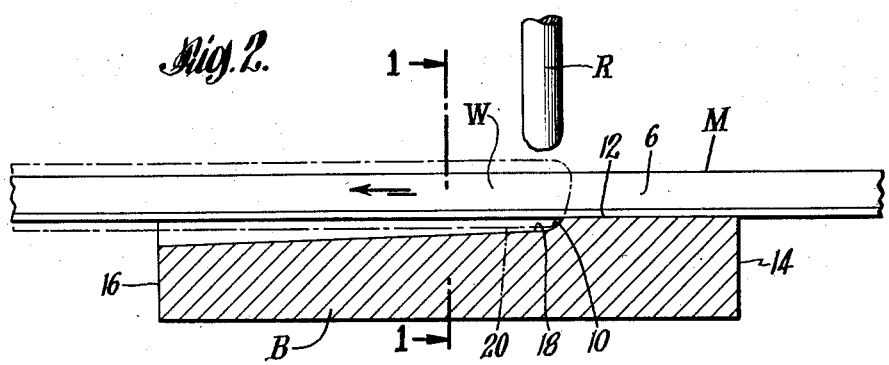
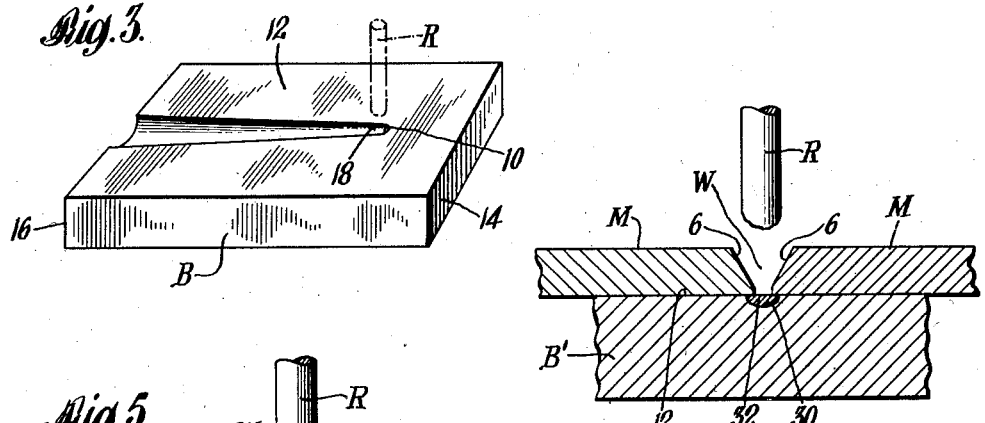
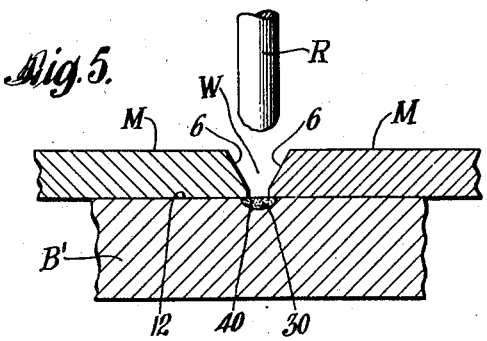
INVENTOR
LLOYD T. JONES
BY
ATTORNEY Patented July 4, 1944

2,352,716

UNITED STATES PATENT OFFICE 2,352,716

WELDING

Lloyd T. Jones, Berkeley, Calif., assignor to The Linde Air Products Company, a corporation of Ohio Application April 24, 1940, Serial No. 331,304

15 Claims. (Cl. 219—10)

This invention relates to the art of joining metal members by welding, and more particularly to an improved method of welding and to an improved backing bar to assist in forming a more perfect weld.

In butt welding metallic members such as steel plates, the opposed edges to be united usually are beveled to provide a groove to receive the melted metal of the filler rod and to facilitate the melting together of the bottommost portions of the juxtaposed edges of the plates. Since it is necessary to thoroughly unite these bottommost edge portions, and since the molten base metal and weld metal at the welding temperatures are very low both in viscosity and in surface tension, a heavy copper bar usually is placed lengthwise of and beneath, and bridges, the seam to be welded, and is pressed into close contact with the back side or surface of the plates, in order to retain in position the melted metal which would otherwise drip through.

In some welding operations, it is customary to provide a groove in and extending along one face of the backing bar, so that the groove may be positioned directly beneath and in alignment with the seam to be welded to serve as a receptacle for such melted metal which runs through the seam, so that such metal will solidify and form a bead along the underside of the weld and also provide a reinforcement for the weld.

The grooves of the backing bars heretofore used have several objections. The molten metal may run ahead of the weld in the groove and along the back side of the work for a considerable distance, depending on the dimensions of the groove. The molten metal that thus runs is, of course, withdrawn from the molten welding pool and hence lowers the level of this pool. After running ahead a certain distance in the groove, the metal solidifies, filling the groove. As the high temperature welding medium (electric arc or oxy-acetylene flame) passes over this solidified metal, the groove being filled, no molten metal can enter the groove or run ahead therein and the welding pool maintains its normal height. This periodic running ahead of the molten metal in the groove and consequent lowering of the pool level, causes an equally periodic misshapen appearance of the upper surface of the completed weld.

Further, the solidifying of the metal in the groove renders it difficult to move the backing bar relative to the work as the weld progresses, since this solidified metal must remain intact and pass lengthwise through the groove when a short backing bar is used and advanced relatively to the work to maintain the bar directly under the welding point or region.

The objects of this invention are to provide an improved welding method in which a reinforcing bead of pre-selected form is formed on the back side of the work and the molten weld metal is prevented from running along the back side of the work in advance of the welding point; to provide improved backing means preferably of high heat conductivity in which the molten weld metal is prevented from running ahead of the weld along the back side of the work; to provide a grooved backing bar in which the drag of solidified weld metal in the groove, during the advance of the bar, is substantially eliminated; to provide a grooved backing bar in which a bead of the exact shape desired may be easily obtained; to provide a grooved backing bar adapted to aid in producing a weld of uniform depth throughout its length; and to provide a backing bar having a tapering groove in one face thereof which groove terminates short of one end of said face.

These and other objects of the invention will in part be obvious and in part become apparent from the following description and the accompanying drawing, in which:

Fig. 1 is a transverse sectional view of one embodiment of the invention, taken on the line 1—1 of Fig. 2, looking in the direction of the arrows;

Fig. 2 is a longitudinal sectional view of the same embodiment of the invention, taken on the line 2—2 of Fig. 1, looking in the direction of the arrows;

Fig. 3 is a perspective view of the backing bar used in the embodiment of the invention illustrated in Figs. 1 and 2; and Figs. 4 and 5 are transverse sectional views, similar to Fig. 1, illustrating other embodiments of the invention.

Generally speaking, the invention comprises a method of weld uniting metal members in which such members are arranged with their adjacent edges in juxtaposition to form a groove or recess to receive molten weld metal. The edges of the members may be cut to form a groove of any desired shape, such as a V or a U, or the edges of the members may be left uncut and separated a short distance, to provide a receptacle or recess to receive the molten metal. The molten metal is then progressively deposited in and along such groove or recess to fill the same. A weld backing means, preferably of high heat conductivity, is provided in operative association with the back side or rear surface of the work members to bridge the welding seam and provide a receptacle for molten metal whereby a weld reinforcing bead may be formed on the back side of the members in alignment with the groove. The backing means is formed to prevent the molten metal from running along the back side of the work in advance of the welding point, and to insure the formation of an integral reinforcing bead of pre-selected form. While the backing means or member and the work may be maintained relatively stationary, the backing means may be advanced along the work in synchronism with the movement of the welding point relative to the work.

Referring more particularly to Figs. 1 and 2 of the drawing, the steel plates M to be weld united are arranged with their edges 6—6 in juxtaposition to form a welding seam W. The welding rod or filler metal R is disposed substantially centrally of the welding seam W. Preferably, the juxtaposed edges 6—6 of plates M are beveled as indicated and are disposed substantially centrally of a receptacle or groove 8 on a backing means such as a bar B operatively associated with the rear surface of the work to bridge the welding seam opposite the welding region. Suitable means (not shown) may be provided for pressing the backing bar B into close engagement with the back side of the members M. The backing bar B has sufficient mass and is of sufficiently high heat conductivity to dissipate heat from the metal forming the bead rapidly enough so that the metal will quickly solidify during the advance of the welding point. Preferably, the bar B is formed of copper or any other suitable metal of high heat conductivity. The groove 8 therein is of varying depth and cross-sectional area, and preferably tapers from a closed end at a point 10 in the upper face 12 of the backing bar B, which point is short of one end 14 of the bar, to the other end 16 of the bar. From the point 10 to the end face 16 the groove 8 increases in depth and in width or cross-sectional dimension for a purpose to be described hereinafter. Preferably, at the point 18 directly beneath the welding point, the groove 8 has a depth corresponding to the form of the finished reinforcing bead desired on the back side of the weld.

In this embodiment of the invention, the bar B and the plates M are adapted to move relatively to each other; and, while either the bar or the work may be the moving element, it usually is desirable to maintain the metal depositing means, such as the welding rod R, and the bar B stationary and move the members M relative thereto in the direction of the arrow in Fig. 2.

In performing the method of the invention, molten weld metal from the rod R is progressively deposited into and along the welding groove or seam W, so that some molten metal flows into the groove 8 at the point 18, thereby forming a bead 20 of the shape desired integral with the back side of the work. The molten metal in the groove 8 is prevented from flowing ahead of the weld by virtue of the fact that the groove 8 is discontinuous beyond the point 10.

When the molten metal contacts the surface of the groove 8 in the bar B, the chilling action of the bar causes the metal to solidify and form the bead 20. Referring to Fig. 2, it will be apparent that as the plates M move to the left the bead 20 gradually moves out of contact with the bottom of the groove 8 as the welding point 18 progresses to the right. Similarly, the bar B may be easily moved relatively to the work, and the drag of the solidified weld metal in either event is substantially eliminated, contrary to the condition that occurs with previous backing bars in which the grooves have been of uniform cross-section and depth throughout their length.

In this embodiment of the invention, as a short copper bar is used, it may, if desired, be cooled by circulating a suitable heat absorbing medium in contact therewith to insure that the bar will not be melted into the weld. The cooling may be accomplished in any well-known manner, and this feature forms no part of the present invention.

While the embodiment of the invention illustrated in Figs. 1, 2, and 3 is preferred, the objects of the invention may be attained by other methods as shown in Figs. 4 and 5. As certain elements illustrated in Figs. 4 and 5 are identical with those shown in Figs. 1, 2, and 3, like reference characters, and like reference characters primed, have been used to indicate identical or corresponding parts.

In the embodiment of the invention illustrated in Fig. 4, the steel plates M are arranged with their adjacent beveled edges 6—6 in juxtaposition to form a welding seam or groove W. In operative engagement with the back side of the members, is a solid copper backing bar B', the upper surface of which is formed with a longitudinal groove 30 disposed in alignment with the seam W. The groove 30 is of uniform depth and cross-section throughout its length and is substantially the exact shape of the bead desired to be formed on the back side of the members M. Before setting the backing bar B' against the under side of the seam to be welded, solid fusible metal, preferably in the form of a bar or rod 32 of metal of the same composition as that to be deposited from the rod R or that forming the members or steel plates M, is placed in and substantially completely fills the groove 30.

The members M and bar B' are maintained stationary and the rod R is moved along the seam as it is melted, substantially filling the seam with molten weld metal. As the welding operation progresses, the rod 32 is progressively melted and unites with the weld metal to form a reinforcing bead therefor when it solidifies. As the solid rod 32 completely fills the groove 30, the welding puddle is maintained at a uniform depth throughout its length, because the unmelted solid portion of the rod prevents molten weld metal from flowing through the groove ahead of the welding point. It will be obvious that a bead of predetermined form is assured and both the upper and lower surface of the welded seam will have a substantially uniform appearance.

The embodiment of the invention illustrated in Fig. 5 is substantially similar to that illustrated in Fig. 4. In this embodiment, however, the rod 32 is omitted and the groove 30 in the upper surface of bar B' is filled with a finely divided granular material 40 which desirably has a melting point substantially equal to the melting point of the members M.

While various materials are suitable for use in this respect, the material preferred should be a refractory mineral composition and of such a nature that it can be fused by the welding heat. Suitably, the granular material has a melting point not substantially higher than that of the metal to be welded, and is substantially free from gas-forming or other ingredients harmful to the weld. Preferably, the material 40 consists chiefly of silicates of the alkaline earth metals and magnesium, and is substantially free from uncombined iron oxides. Solidifiers or other fluxes may be added if desired. It is also preferred that the ingredients of the material 40 should be mixed, pre-fused to complete chemical reactions between the ingredients, and subsequently crushed or ground to the desired size.

In electric welding operations such as the one disclosed in Patent No. 2,043,960, issued in the names of Jones, Kennedy and Rotermund, wherein the tip of the electrode is submerged under a blanket of refractory material, it is desirable to place the same kind of refractory material in the groove 30 of the backing bar shown in Fig. 5.

As the welding progresses, molten metal is progressively deposited in and along seam W and fills the groove 30 displacing the granular material 40, which is progressively fused and flows to the top of the weld. The unfused portion of the granular material ahead of the welding point prevents molten weld metal from running ahead in the groove 30, assuring a uniform depth of metal in seam W. Consequently, a bead of uniform depth and cross-sectional area is obtained on the back of the welded joint and the appearance of the upper surface of the weld is substantially uniform.

The principles of the invention may be used with any type of welding, and the heat to melt the rod R and the juxtaposed edges of the plates M may be furnished by an oxy-fuel gas torch, by an electric arc, or by any other suitable means. If the invention is used in a welding operation of the type described and claimed in Patent No. 2,043,960, the heating may be accomplished by a suitable source of electric current connected to the rod R and the metal members M. The principles of the invention are applicable also to other special types of welding operations, such as, for example, "Thermit" welding.

Although grooves of substantially semi-circular cross-section are shown in the drawing, it should be understood that the invention is not limited to the particular cross-sectional contour of the groove, as other cross-sectional contours may be practical and desirable under certain conditions. Also, while the solid metal rod 32 is shown as semi-cylindrical, the same may be rectangular, triangular or any other shape, provided the groove 30 is completely filled with solid metal, or the solid metal to fill the groove 30 may be provided in other than the form of a rod. While the members M are shown with beveled edges, it has been found in practicing the present invention that the members M may be adequately weld united if their edges are not beveled, provided a substantial gap is left between the same. The several backing bars shown assure the formation of a bead of desired dimensions along the back of the welding groove or seam irrespective of the shape of the adjacent edges of the members.

While preferred embodiments of the invention have been described and illustrated, it will be readily apparent to those skilled in the art that the invention may be otherwise embodied and practiced and that physical changes may be made in the dimensions and form of the illustrated elements without departing from the scope of the invention.

What is claimed is:

1. A method of weld uniting metal members with a welded joint having a bead of pre-selected form on its back side which comprises arranging said members with their adjacent edges in juxtaposition to form a seam to be welded; bridging the back side of said seam with backing chill means of relatively high heat conductivity and mass; providing in said backing means a receptacle at least a portion of which is the exact shape of the bead desired; progressively depositing molten metal in and along said seam from the other side of the latter and in said receptacle to provide a welded joint beaded along its back side while preventing such molten metal from running along the back side of said seam in advance of the welding point; and, as said molten metal in said receptacle solidifies to form a bead on the back side of said seam, progressively moving said backing chill means out of contact with said bead while maintaining said means in contact with said members.

2. A method of weld uniting metal members with a welded joint having a bead of pre-selected form on its back side which comprises arranging said members with their adjacent edges in juxtaposition to form a seam to be welded; bridging the back side of said seam with backing means of relatively high heat conductivity; providing in said backing means a receptacle at least a portion of which is the exact shape of the bead desired; disposing in said receptacle solid fusible metal completely filling said receptacle; progressively depositing molten metal in and along said seam from the other side of the latter; and simultaneously therewith progressively and locally melting said solid fusible metal over its entire cross-sectional area without melting said backing means, and thereafter removing said back means, to provide a welded joint beaded along its back side.

3. A method of weld uniting metal members with a welded joint having a bead of pre-selected form on its back side which comprises arranging said members with their adjacent edges in juxtaposition to form a seam to be welded; bridging the back side of said seam with copper chill means of high mass providing in said backing chill means a receptacle at least a portion of which is the exact shape of the bead desired; disposing in said receptacle a mass of unbonded granular fusible refractory mineral material which is free from substances that evolve gas when heated to welding temperature; progressively depositing molten metal in and along said seam from the other side of the latter; and simultaneously therewith progressively fusing said refractory material so that said molten metal will progressively displace said material to provide a welded joint, beaded along its back side.

4. In combination, means for depositing molten metal progressively along a seam between the opposed edges of two juxtaposed metal members to produce a welded joint uniting said members; and a backing chill bar of high heat conductivity and mass engaging successive portions of the rear surfaces of said members and bridging said seam opposite the welding region adjacent such metal-depositing means, said backing bar having a groove cooperating with said seam to hold molten metal during its solidification and thereby produce a bead integral with and extending along the back side of said joint, such groove having provision for preventing the molten metal therein from flowing along said seam ahead of the welded joint a sufficient distance to interfere with the pool of deposited molten metal.

5. In combination, means for depositing molten metal progressively along a seam between the opposed edges of two juxtaposed metal members to produce a welded joint uniting said members; and a backing bar arranged and adapted to progressively engage successive portions of the rear surfaces of said members and to bridge said seam opposite the welding region adjacent such metal-depositing means, said backing bar having a groove cooperating with said seam to hold molten metal during its solidification and thereby produce a bead integral with and extending along the back side of said joint, such groove having a closed end located a short distance ahead of said welding region.

6. A combination as defined in claim 4, wherein such provision comprises solid fusible metal within and extending along said groove ahead of said welded joint, such solid metal having substantially the same composition as such deposited metal and melting progressively as the welding advances along said seam.

7. A combination as defined in claim 4, in which such provision comprises granular fusible mineral material within and extending along said groove ahead of said welding region, such material melting progressively as the welding advances along said seam, leaving unmolten the portion of such material ahead of the welding region.

8. For use in welding operations, a backing bar having a surface adapted to be disposed in contact with the back side of the members to be welded, said surface being formed with a groove extending longitudinally and substantially centrally thereof from a first point short of one end of said surface to a second point on the other end of said surface.

9. For use in welding operations, a backing bar having a surface adapted to be disposed in contact with the back side of the members to be welded, said surface being formed with a groove extending longitudinally and substantially centrally thereof from a first point short of one end of said surface to a second point on the other end of said surface, said groove increasing in depth from said first point to said second point.

10. For use in welding operations, a backing bar having a surface adapted to be disposed in contact with the back side of the members to be welded, said surface being formed with a groove extending longitudinally and substantially centrally thereof from a first point short of one end of said surface to a second point on the other end of said surface, said groove increasing in cross-sectional area from said first point to said second point.

11. Welding apparatus comprising means operatively associated with the members to be welded to form a bead of pre-selected form on the back side of such members, said means including, in combination, chill means providing a receptacle of high heat conductivity and mass for the molten weld metal forming such bead; and means preventing such molten weld metal from running along the back side of such members in advance of the welding point.

12. Means for forming a weld reinforcing bead of pre-selected form on the back side of metal members to be weld united, said means comprising, in combination, a metal bar formed of metal of high heat conductivity and having extending through one face thereof a groove of the exact form of the bead desired; and a metal rod, of the same composition as the members to be weld united, disposed in and completely filling said groove.

13. Means for forming a weld reinforcing bead of pre-selected form on the back side of metal members to be weld united, said means comprising, in combination, a metal chill bar formed of metal of high heat conductivity and mass and having extending through one face thereof a groove of the exact form of the bead desired; and a mass of unbonded granular refractory mineral material, free from substances that evolve gas when heated to welding temperature, disposed in and completely filling said groove, said mineral material serving to prevent the flow of molten weld metal along said groove ahead of the welding point, and cooperating with said groove in said bar to enhance the uniformity of surface and cross-sectional area of the weld reinforcing bead.

14. Means for forming a bead on the back side of a weld, said means comprising a copper bar having in one surface thereof a discontinuous tapered groove adapted to be aligned with the back side of a seam to be welded, said groove extending only from a point intermediate of the ends of the bar to one end thereof and tapering from said end to said intermediate point.

15. In combination, a weld rod adapted to have an electric fusion-welding current maintained from the end thereof to a seam between opposed edges of two juxtaposed metal members adapted to be arranged thereunder and to be progressively welded, and a copper backing member having a surface adapted to engage successive portions of the rear surface of said members to be welded and to bridge said seam opposite the end of the weld rod, said surface of the backing member being formed with a groove extending only from a point intermediate of the extremities thereof to one end thereof, said intermediate point being positioned near the end of the weld rod and said groove adapted to extend longitudinally of and directly underneath the seam in a direction downstream with respect to the seam which is adapted to be progressively welded, whereby said groove is adapted to underlie welded portions of the seam.

LLOYD T. JONES.